UNITED STATES PATENT OFFICE.

HORACE FREEMAN, OF VANCOUVER, BRITISH COLUMBIA, CANADA, ASSIGNOR TO AMERICAN CYANAMID COMPANY, OF NEW YORK, N. Y., A CORPORATION OF MAINE.

CRUDE CYANID AND PROCESS OF PRODUCING THE SAME.

1,277,898.  Specification of Letters Patent.  Patented Sept. 3, 1918.

No Drawing.   Application filed November 29, 1916.   Serial No. 134,156.

*To all whom it may concern:*

Be it known that I, HORACE FREEMAN, a subject of the King of Great Britain, residing at Vancouver, in the Province of British Columbia and Dominion of Canada, have invented certain new and useful Improvements in Crude Cyanids and Processes of Producing the Same; and I do hereby declare the following to be a full, clear, and exact description of the invention, such as will enable others skilled in the art to which it appertains to make and use the same.

This invention relates to a process for producing cyanids from alkaline earth metal cyanamids and especially from calcium cyanamid, the well known lime nitrogen of commerce, as well as to the cyanids produced thereby, and has for its object to provide a process which will yield larger percentages of cyanids than those heretofore proposed, and one that will further produce said cyanids, without further purification, in forms suitable for the extraction of gold from its ores.

With this and other objects in view the invention consists in the novel composition of matter as well as in the novel steps and combinations of steps constituting the process all as will be more fully hereinafter disclosed and particularly pointed out in the claims.

In order that the precise invention may be the more clearly understood it is said:—

It has been heretofore proposed to produce cyanids from calcium cyanamid by mixing with the said cyanamid an alkali metal chlorid, such for example, as sodium chlorid, and for the reaction either employing the carbon present in the commercial calcium cyanamid or adding carbon to the pure cyanamid from an outside source. But I have found from actual experiment that the yields in the case of the use of commercial cyanamid are very small, frequently not over 8% or 10% of the theoretical amount.

Pure cyanamid of calcium is not commercially available, and therefore, so far as I am aware, its yield of cyanid from its mixture with free carbon and sodium chlorid has never been determined.

I have found that the reason for the deficiency in yield of cyanid when using commercial calcium cyanamid is due very largely, if not entirely, to the character of the carbon present in the lime nitrogen. I have further found that even if free carbon is added to the lime nitrogen, in a manner similar to what has been proposed in connection with the use of pure calcium cyanamid, still the yields of cyanid are very small and unsatisfactory unless amorphous carbon is employed; and that said yields will still be very unsatisfactory should the said amorphous carbon be heated beyond certain temperatures, before the reaction takes place, all as will more fully appear below.

A typical reaction involved in the present process may be stated in two equations as follows:—

(a)  $CaCN_2 + 2NaCl = CaCl_2 + Na_2N_2C.$
(b)  $Na_2N_2C + C = 2NaCN.$

It will be seen that one of the products of the first equation is sodium cyanamid, and that this said cyanamid reacts with the added carbon to form the desired sodium cyanid. The carbon originally present in the lime nitrogen is found to take only a small part in the reaction and therefore a large proportion of the same remains mixed with the cyanid produced together with the calcium chlorid. But these impurities have been found in actual tests not to interfere, in any way, with the efficient use of the crude cyanid in the process of extracting gold from its ores.

In this respect my process produces a product which should be carefully distinguished from another proposed product which may be produced by heating a mixture of lime nitrogen, sodium sulfid, sodium chlorid and carbon to a reacting temperature. The sodium cyanid produced by this last named reaction contains as impurities a large percentage of the original carbon present in the lime nitrogen, as well as a large quantity of calcium sulfid which is slightly soluble. It follows that should this last named cyanid be employed on a large scale for the extraction of gold from its ores, sulfids will appear in the solution and give trouble, which is not the case when the cyanid is produced by my process.

As above stated, it is very desirable in carrying out the process to employ carbon in an amorphous form. In other words, the carbon employed should not only be in a finely divided state and uniformly distributed throughout the mass, but in order to obtain the best yields it should be amorphous and should not have been previously heated to a temperature higher than say 1000° C., or preferably to a temperature exceeding that at which the first of the above reactions commences. I have found by actual tests that if the carbon has been previously heated to a higher temperature than that indicated, the commercial yields are reduced.

The carbon may be admixed with the cyanamid as pure carbon, but preferably as a carbonaceous material which will later become carbonized during the earlier heating of the mixture, in which case care must be taken that the temperature is raised so slowly that the carbonization may be effected before the reaction commences. In other words, the carbon may be introduced as very finely divided coal, as charcoal, in the form of lamp black, or other like substance, but it is preferably introduced in the form of pitch or tar, which becomes carbonized during the process. Particular care should be taken that the carbon is uniformly distributed throughout the mass and that it is brought intimately into contact with the particles of the lime nitrogen and of the alkali chlorid present. This can be conveniently brought about by mixing the carbonaceous material with a liquid solvent or medium that will carry it in a finely divided state throughout the mixture of lime nitrogen and alkali metal chlorid, with which it may be ground together at a consistency such that the ingredients will not settle or separate out.

Should no carbon be employed other than that already present in the lime nitrogen, upon fusing the mass an objectionable foaming takes place. On the other hand, I find that when soft coal, pitch, tar or lamp black is added to the mass, this foaming is completely avoided, and an increased yield is obtained. Other forms of amorphous carbon, such, for example, as finely divided charcoal, permit a greater or less foaming while producing increased yields over those obtained without said addition of carbon, but such yields are not so great as is the case when pitch, for example, is used. For this, and other economic reasons, I prefer to employ a sufficient proportion of pitch to entirely stop the foaming. I find that a weight of pitch containing 40% of fixed carbon equal to about 15% of the weight of the lime nitrogen present will permit a small amount of foaming while 20% of this pitch will stop it entirely.

A specific example of the carrying out of this process is as follows:—I may take 100 parts by weight of lime nitrogen and add 90 to 100 parts by weight of alkali metal chlorid, say for example, sodium chlorid, the actual amount of chlorid being dependent upon the nitrogen content of the lime nitrogen employed. The higher the nitrogen content the more chlorid will be used. That is to say, with lime nitrogen containing say 23% of nitrogen 100 parts of chlorid will give satisfactory results. To these constituents are added 20 parts by weight of pitch containing say 40% of fixed or non-volatile carbon; and to insure that the carbonaceous substance is uniformly distributed throughout the mixture and effectively coats the particles of lime nitrogen and chlorid, an oil or spirit may be added such for example as petroleum, tar oil or benzin which is miscible with the carbonaceous substance and which will have no deleterious effect on the lime nitrogen. These ingredients are ground together in any suitable mill.

After a sufficient grinding is had, to insure that the carbonaceous material is evenly and completely distributed throughout the mass and is in intimate contact with the lime nitrogen and chlorid, the mixture is subjected, preferably with a continuous agitation, to a temperature only sufficient to effect the evaporation of the liquid medium and the carbonization of the carbonaceous material. It is preferred to carry out this operation in a closed vessel so that the volatile constituents may be condensed and recovered. The carbonized mass may then be gradually brought to a reacting temperature in a suitable furnace, or to a temperature between say 800° C. and 1300° C. A satisfactory yield is obtained when about 1300° C. has been reached, but the maximum temperature required varies somewhat with the actual composition of the mass and it is seldom found necessary to maintain said maximum temperature for more than from ten to thirty minutes.

The product obtained by following the above procedure will be found to contain from say 27% to 32% of its weight in sodium cyanid, and when a very high grade of lime nitrogen is used, with a minimum quantity of sodium chlorid, an even higher grade product may be obtained.

The carbonized materials thus produced in the masses above disclosed, although containing but a small proportion of carbon, are yet electric conductors, and are therefore adapted for fusing the said masses in electric resistance furnaces where they can be gradually brought to the maximum reacting temperatures required. In other words, I prefer to carry out this process in suitable types of electric resistance furnaces.

An important feature of this invention, as above stated, resides in the use of amorphous carbon that has not been overheated or of carbon in a condition that it will most readily react with the constituents of the fused mass. Stated in other language, I have found that carbon appearing in lime nitrogen, as well as carbon in a crystalline or graphitic form is not suitable for this process even though it be very finely divided.

Also I have found that carbon which is associated with oxygen or sulfur, or which when heated yields any considerable amount of ash or other non-carbonaceous material is not as well suited for this process as are those substances like lamp black, pitch or tar, which when heated yield substantially pure carbon.

A further important feature of the invention resides in the fact that the crude alkali metal cyanid produced contains such a large proportion of cyanid that it is economically possible to separate its contained cyanogen in pure forms which is not the case with crude cyanids prepared in any other known manner.

Of course, any alkali earth metal cyanamid such as calcium cyanamid or barium cyanamid may be used in carrying out this process, and any alkali metal chlorid may be also used, but I prefer to employ calcium cyanamid and sodium chlorid.

It will now be clear that it is an important feature of the process that enables the operator to so select his source of carbon as to produce a crude cyanid, so free from sulfids that it may be used directly without further purification in cyaniding ores.

It should also be mentioned that the crude product as above prepared contains say about 5% or over of calcium oxid some of which in the cyaniding process performs the useful function of maintaining the alkalinity of the solution.

In employing a pitch containing 40% fixed carbon I have found that if the weight of the pitch is more than 30% of the weight of the lime nitrogen present, the yield of cyanid ceases to increase, therefore care should be taken to avoid the use of a great excess of carbon in the mixture. The most suitable proportions of carbon will vary with the kind of carbon used and with its manner of incorporation in the charge. The best amounts of carbon in each case can be determined by trial.

I have further found that the highest efficiencies are attained when a slight excess of alkali metal chlorid over theoretical requirements is employed. Usually this excess need not exceed say 5%.

It is obvious that those skilled in the art may vary the mode of procedure as well as the details of the process without departing from the spirit of the invention and therefore I do not wish to be limited to the above disclosure except as may be required by the claims.

What I claim is:—

1. The process of producing an alkali metal cyanid which consists in providing an intimate mixture of an alkaline earth metal cyanamid, an alkali metal chlorid and amorphous carbon which has been heated to a temperature not substantially higher than the temperature at which the reaction begins; and heating said mixture to a temperature sufficient to produce said cyanid, substantially as described.

2. The process of producing an alkali metal cyanid which consists in providing an intimate mixture of an alkaline earth metal cyanamid, an alkali metal chlorid and amorphous carbon in a finely divided condition, said carbon having been previously heated to a temperature not higher than 1000° C.; and heating said mixture to a temperature sufficient to produce said cyanid, substantially as described.

3. The process of producing an alkali metal cyanid which consists in providing an intimate mixture of an alkaline earth metal cyanamid, an alkali metal chlorid and a carbonaceous material capable of yielding substantially pure carbon when heated; producing from said material substantially pure carbon before any reaction takes place between said cyanamid and said chlorid; and heating said mixture to a temperature sufficient to produce said cyanid, substantially as described.

4. The process of producing sodium cyanid which consists in providing an intimate mixture of lime nitrogen, sodium chlorid and a carbonaceous material capable of yielding substantially pure carbon when heated; converting said material into substantially pure carbon; and heating said mixture to a temperature sufficient to produce said cyanid, substantially as described.

5. The process of producing sodium cyanid which consists in providing an intimate mixture of lime nitrogen, sodium chlorid and a carbonaceous material capable of assuming a fluid condition; converting said material through the agency of heat into substantially pure carbon; and heating said mixture to a temperature sufficient to produce said cyanid, substantially as described.

6. The process of producing sodium cyanid which consists in providing an intimate mixture of lime nitrogen, sodium chlorid, a carbonaceous material capable of assuming a fluid condition and a liquid vehicle for said material; converting said material into substantially pure carbon; and heating said mixture to a temperature sufficient to produce said cyanid, substantially as described.

7. The process of producing sodium cyanid which consists in providing an intimate mixture of lime nitrogen, an excess of sodium chlorid, a carbonaceous material capable of yielding a substantially pure carbon when heated, and in an amount capable of preventing foaming of the mass when fused; converting said material into substantially pure carbon; and heating the mixture to a reacting temperature, substantially as described.

8. The process of producing an alkali metal cyanid in an electric furnace which consists in providing a suitable electrically conducting mixture of an alkaline earth metal cyanamid, an alkali metal chlorid and amorphous carbon; and passing a current of electricity through said mixture until a reacting temperauture is reached, substantially as described.

9. The process of producing an alkali metal cyanid in an electric furnace which consists in providing a mixture of an alkaline earth metal cyanamid, an alkaline earth metal chlorid and a carbonaceous material capable of yielding substantially pure carbon when heated; converting said material into an electrically conducting form; and passing a current of electricity through the mass containing said electrically conducting carbon until a reacting temperature is reached, substantially as described.

10. The herein described composition of matter containing more than 20% by weight of sodium cyanid mixed with sodium chlorid, calcium chlorid, calcium oxid, and carbon, substantially as described.

11. The herein described composition of matter containing more than 30% sodium cyanid mixed with calcium chlorid, calcium oxid, and carbon, substantially as described.

12. The herein described composition of matter containing more than 32% of sodium cyanid, mixed with calcium chlorid, calcium oxid and carbon, substantially as described.

13. The process of making sodium cyanid which consists in providing a mixture containing an alkali earth metal cyanamid, sodium chlorid and a substance containing carbon, which has been heated to a temperature not higher than that at which the reaction begins and said cyanamid and chlorid being present in proportions substantially sufficient to form sodium cyanamid; heating said mixture to a temperature sufficient to form said sodium cyanamid in the presence of said carbon-containing substance, and permitting the carbon of said substance to unite with said sodium cyanamid to form the desired sodium cyanid, substantially as described.

14. The process of making sodium cyanid which consists in reacting on an alkali earth metal cyanamid with sodium chlorid to form sodium cyanamid; and then reacting on said sodium cyanamid as fast as it is formed with carbon to form said sodium cyanid, substantially as described.

15. The process of decreasing the decomposition of the sodium cyanamid formed while making sodium cyanid from calcium cyanamid and sodium chlorid which consists in reacting on said sodium cyanamid with added chemically active carbon as said sodium cyanamid is produced, substantially as described.

In testimony whereof I affix my signature, in presence of a witness.

HORACE FREEMAN.

Witness:
T. A. WITHERSPOON.